United States Patent
Graham (10) Patent No.: US 6,735,715 B1
(45) Date of Patent: May 11, 2004

(54) SYSTEM AND METHOD FOR OPERATING A SCSI BUS WITH REDUNDANT SCSI ADAPTORS

(75) Inventor: Simon P. Graham, Bolton, MA (US)

(73) Assignee: Stratus Technologies Bermuda Ltd., Hamilton (BM)

(*) Notice: Subject to any disclaimer, the term of this patent is extended or adjusted under 35 U.S.C. 154(b) by 0 days.

(21) Appl. No.: 09/548,530

(22) Filed: Apr. 13, 2000

(51) Int. Cl.[7] .............................................. G06F 11/00
(52) U.S. Cl. ............................................. 714/9; 714/43
(58) Field of Search ................................ 714/43, 56, 2, 714/3, 9; 710/100, 120, 119, 312, 311, 306

(56) References Cited

U.S. PATENT DOCUMENTS

| | | | |
|---|---|---|---|
| 3,544,973 A | 12/1970 | Borck, Jr. et al. | 340/172.5 |
| 3,548,176 A | 12/1970 | Shutler | 235/153 |
| 3,641,505 A | 2/1972 | Artz et al. | 340/172.5 |
| 3,710,324 A | 1/1973 | Cohen et al. | 340/172.5 |
| 3,736,566 A | 5/1973 | Anderson et al. | 340/172.5 |
| 3,795,901 A | 3/1974 | Boehm et al. | 340/172.5 |
| 3,805,039 A | 4/1974 | Stiffler | 235/153 AE |
| 3,820,079 A | 6/1974 | Bergh et al. | 340/172.5 |
| 3,840,861 A | 10/1974 | Amdahl et al. | 340/172.5 |
| 3,997,896 A | 12/1976 | Cassarino, Jr. et al. | 340/172.5 |
| 4,015,246 A | 3/1977 | Hopkins, Jr. et al. | 340/172.5 |
| 4,032,893 A | 6/1977 | Moran | 340/166 R |
| 4,059,736 A | 11/1977 | Perucca et al. | 179/175.2 R |
| 4,228,496 A | 10/1980 | Katzman et al. | 364/200 |
| 4,245,344 A | 1/1981 | Richter | 371/68 |
| 4,263,649 A | 4/1981 | Lapp, Jr. | 364/200 |
| 4,275,440 A | 6/1981 | Adams, Jr. et al. | 364/200 |
| 4,309,754 A | 1/1982 | Dinwiddie, Jr. et al. | 364/200 |
| 4,366,535 A | 12/1982 | Cedolin et al. | 364/200 |
| 4,434,463 A | 2/1984 | Quinquis et al. | 364/200 |
| 4,449,182 A | 5/1984 | Rubinson et al. | 364/200 |

(List continued on next page.)

FOREIGN PATENT DOCUMENTS

| | | | |
|---|---|---|---|
| EP | 0 299 700 | 7/1987 | G06F/13/42 |
| EP | 0 301 499 A2 | 2/1989 | G06F/11/16 |
| EP | 0 428 330 A2 | 5/1991 | G06F/13/30 |
| EP | 0 475 005 B1 | 11/1995 | G06F/15/16 |
| EP | 0 293 860 B1 | 2/1996 | G06F/13/28 |
| EP | 0772127 A1 | 5/1997 | 11/20 |
| EP | 0 390 567 B1 | 6/1999 | H04L/29/06 |
| GB | 2 060 229 A2 | 4/1981 | G06F/3/00 |

*Primary Examiner*—Robert Beausoliel
*Assistant Examiner*—Gabriel Chu
(74) *Attorney, Agent, or Firm*—Testa, Hurwitz & Thibeault, LLP (57) ABSTRACT

A computer system includes a port duplex driver (PDD) that creates a "virtual SCSI adaptor," to control the operations of one or more redundant SCSI adaptors. During boot-up operations or when the status of a device on a SCSI bus changes, the PDD identifies the virtual SCSI adaptor as the only adaptor that provides access to particular storage devices on the SCSI bus. System components then direct data transfer operations through the virtual SCSI adaptor to the storage devices. The PDD intercepts commands that are directed through the virtual SCSI adaptor, and redirects the commands to a selected one of the actual SCSI adaptors. The selected SCSI adaptor then operates in a conventional manner, to translate the generic commands from the system components to device-specific commands for the storage devices on the SCSI bus. If the selected SCSI adaptor fails, the PDD redirects the data transfer operations instead through one of the redundant SCSI adaptors. The failure does not affect the remainder of the system, which continues to conduct data transfer operations through the virtual SCSI adaptor.

13 Claims, 8 Drawing Sheets

U.S. PATENT DOCUMENTS

| | | | |
|---|---|---|---|
| 4,453,215 A | 6/1984 | Reid | 364/200 |
| 4,467,436 A | 8/1984 | Chance et al. | 364/513 |
| 4,484,273 A | 11/1984 | Stiffler et al. | 364/200 |
| 4,486,826 A | 12/1984 | Wolff et al. | 364/200 |
| 4,503,496 A | 3/1985 | Holzner et al. | 364/200 |
| 4,543,628 A | 9/1985 | Pomfret | 364/200 |
| 4,590,554 A | 5/1986 | Glazer et al. | 364/200 |
| 4,597,084 A | 6/1986 | Dynneson et al. | 371/51 |
| 4,608,631 A | 8/1986 | Stiffler et al. | 364/200 |
| 4,628,447 A | 12/1986 | Cartret et al. | 364/200 |
| 4,630,193 A | 12/1986 | Kris | 364/200 |
| 4,633,394 A | 12/1986 | Georgiou et al. | 364/200 |
| 4,654,857 A | 3/1987 | Samson et al. | 371/68 |
| 4,669,056 A | 5/1987 | Waldecker et al. | 364/900 |
| 4,669,079 A | 5/1987 | Blum | 370/85 |
| 4,700,292 A | 10/1987 | Campanini | 364/200 |
| 4,703,420 A | 10/1987 | Irwin | 364/200 |
| 4,750,177 A | 6/1988 | Hendrie et al. | 371/32 |
| 4,805,091 A | 2/1989 | Thiel et al. | 364/200 |
| 4,809,169 A | 2/1989 | Sfarti et al. | 364/200 |
| 4,816,990 A | 3/1989 | Williams | 364/200 |
| 4,827,409 A | 5/1989 | Dickson | 364/200 |
| 4,866,604 A | 9/1989 | Reid | 364/200 |
| 4,914,580 A | 4/1990 | Jensen et al. | 364/200 |
| 4,916,695 A | 4/1990 | Ossfeldt | 371/9.1 |
| 4,926,315 A | 5/1990 | Long et al. | 364/200 |
| 4,931,922 A | 6/1990 | Baty et al. | 364/200 |
| 4,939,643 A | 7/1990 | Long et al. | 364/200 |
| 4,974,144 A | 11/1990 | Long et al. | 364/200 |
| 4,974,150 A | 11/1990 | Long et al. | 364/200 |
| 4,985,830 A | 1/1991 | Atac et al. | 364/200 |
| 4,994,960 A | 2/1991 | Tuchler et al. | 364/200 |
| 5,083,258 A | 1/1992 | Yamasaki | 395/725 |
| 5,117,486 A | 5/1992 | Clark et al. | 395/250 |
| 5,138,257 A | 8/1992 | Katsura | 324/158 R |
| 5,179,663 A | 1/1993 | Iimura | 395/250 |
| 5,243,704 A | 9/1993 | Baty et al. | 395/325 |
| 5,247,522 A | 9/1993 | Reiff | 371/29.5 |
| 5,251,303 A | 10/1993 | Fogg, Jr. et al. | 395/275 |
| 5,270,699 A | 12/1993 | Signaigo et al. | 340/825.01 |
| 5,295,258 A | 3/1994 | Jewett et al. | 395/575 |
| 5,313,627 A | 5/1994 | Amini et al. | 395/575 |
| 5,317,726 A | 5/1994 | Horst | 395/575 |
| 5,428,766 A | 6/1995 | Seaman | 395/575 |
| 5,463,755 A | 10/1995 | Dumarot et al. | 395/475 |
| 5,465,340 A | 11/1995 | Creedon et al. | 395/846 |
| 5,537,535 A | 7/1996 | Maruyama et al. | 395/183.01 |
| 5,546,535 A | 8/1996 | Stallmo et al. | 714/9 |
| 5,550,986 A | 8/1996 | DuLac | 395/280 |
| 5,555,372 A | 9/1996 | Tetreault et al. | 395/182.13 |
| 5,574,865 A | 11/1996 | Hashemi | 395/283 |
| 5,584,030 A | 12/1996 | Husak et al. | 395/750 |
| 5,600,784 A | 2/1997 | Bissett et al. | 395/182.1 |
| 5,613,162 A | 3/1997 | Kabenjian | 395/842 |
| 5,627,965 A | 5/1997 | Liddell et al. | 395/185.01 |
| 5,630,056 A | 5/1997 | Horvath et al. | 395/185.09 |
| 5,659,681 A | 8/1997 | Ojima | 395/183.19 |
| 5,671,443 A | 9/1997 | Stauffer et al. | 395/845 |
| 5,696,905 A | 12/1997 | Reimer et al. | 395/227 |
| 5,701,410 A | 12/1997 | BeMent et al. | 395/183.19 |
| 5,701,457 A | 12/1997 | Fujiwara | 395/608 |
| 5,737,601 A | 4/1998 | Jain et al. | 395/617 |
| 5,751,955 A | 5/1998 | Sonnier et al. | 395/200.19 |
| 5,758,065 A | 5/1998 | Reams et al. | 395/185.01 |
| 5,790,397 A | 8/1998 | Bissett et al. | 364/131 |
| 5,790,775 A * | 8/1998 | Marks et al. | 714/9 |
| 5,809,256 A | 9/1998 | Najemy | 395/283 |
| 5,809,285 A | 9/1998 | Hilland | 703/25 |
| 5,812,748 A | 9/1998 | Ohran et al. | 395/182.02 |
| 5,815,647 A | 9/1998 | Buckland et al. | 395/182.01 |
| 5,828,903 A | 10/1998 | Sethuram et al. | 395/817 |
| 5,838,899 A | 11/1998 | Leavitt et al. | 395/185.09 |
| 5,838,900 A | 11/1998 | Horvath et al. | 395/185.09 |
| 5,838,993 A | 11/1998 | Riley et al. | 395/842 |
| 5,862,145 A | 1/1999 | Grossman et al. | 371/5.1 |
| 5,875,308 A | 2/1999 | Egan et al. | 395/283 |
| 5,875,351 A | 2/1999 | Riley | 395/842 |
| 5,881,251 A | 3/1999 | Fung et al. | 395/283 |
| 5,892,928 A | 4/1999 | Wallach et al. | 395/283 |
| 5,894,560 A | 4/1999 | Carmichael et al. | 395/845 |
| 5,903,778 A | 5/1999 | Chang | 395/882 |
| 5,928,339 A | 7/1999 | Nishikawa | 710/26 |
| 5,944,800 A | 8/1999 | Mattheis et al. | 710/23 |
| 5,953,538 A | 9/1999 | Duncan et al. | 395/842 |
| 5,956,476 A | 9/1999 | Ranson et al. | 395/183.06 |
| 5,978,866 A | 11/1999 | Nain | 710/22 |
| 5,982,672 A | 11/1999 | Moon et al. | 365/189.01 |
| 5,983,289 A | 11/1999 | Ishikawa et al. | 710/35 |
| 5,991,844 A * | 11/1999 | Khosrowpour | 710/312 |
| 5,991,900 A | 11/1999 | Garnett | 714/56 |
| 5,996,035 A | 11/1999 | Allen et al. | 710/103 |
| 6,000,043 A | 12/1999 | Abramson | 714/44 |
| 6,009,481 A | 12/1999 | Mayer | 710/33 |
| 6,009,535 A | 12/1999 | Halligan et al. | 714/5 |
| 6,012,119 A * | 1/2000 | Ninomiya et al. | 710/305 |
| 6,012,120 A | 1/2000 | Duncan et al. | 710/129 |
| 6,021,456 A | 2/2000 | Herdeg et al. | 710/260 |
| 6,026,458 A | 2/2000 | Rasums | 710/103 |
| 6,032,201 A | 2/2000 | Tillery, Jr. et al. | 710/8 |
| 6,032,271 A | 2/2000 | Goodrum et al. | 714/56 |
| 6,041,375 A | 3/2000 | Bass et al. | 710/103 |
| 6,047,343 A | 4/2000 | Olarig | 710/102 |
| 6,049,894 A | 4/2000 | Gates | 714/41 |
| 6,052,795 A * | 4/2000 | Murotani et al. | 714/3 |
| 6,055,584 A | 4/2000 | Bridges et al. | 710/27 |
| 6,062,480 A | 5/2000 | Evoy | 235/492 |
| 6,073,196 A | 6/2000 | Goodrum et al. | 710/103 |
| 6,085,333 A | 7/2000 | DeKoning et al. | 714/7 |
| 6,098,137 A | 8/2000 | Goodrum et al. | 710/129 |
| 6,125,417 A | 9/2000 | Bailis et al. | 710/103 |
| 6,128,750 A * | 10/2000 | Espy et al. | 714/7 |
| 6,141,769 A | 10/2000 | Petivan et al. | 714/10 |
| 6,154,802 A * | 11/2000 | Khosrowpour | 710/312 |
| 6,185,697 B1 * | 2/2001 | Shiraishi | 714/6 |
| 6,202,115 B1 * | 3/2001 | Khosrowpour | 710/312 |
| 6,324,627 B1 | 11/2001 | Kricheff et al. | 711/163 |
| 6,363,448 B1 * | 3/2002 | Waller et al. | 710/312 |
| 6,430,710 B1 * | 8/2002 | Moriyama et al. | 714/43 |
| 6,449,731 B1 * | 9/2002 | Frey, Jr. | 714/9 |
| 6,519,671 B1 * | 2/2003 | Kondou et al. | 710/311 |
| 6,563,595 B1 * | 5/2003 | Galloway | 358/1.1 |

\* cited by examiner

SYSTEM AND METHOD FOR OPERATING A SCSI BUS WITH REDUNDANT SCSI ADAPTORS

FIELD OF THE INVENTION

The invention relates generally to fault tolerant computer systems and, more particularly, to mechanisms for fault tolerant access to storage subsystems.

BACKGROUND OF THE INVENTION

Storage devices, such as disk drives, typically attach to and communicate with a computer system over a SCSI bus. Other devices, such as the key board and system processor, communicate with the storage devices over a system I/O bus such as a PCI bus. To facilitate communication between the devices on the two busses, a SCSI adaptor plugs into both busses. The SCSI adaptor is essentially a translator, which receives generic commands generated by the system components, and translates the commands to specialized commands for the particular storage devices that are attached to the SCSI bus. The system components thus have to know only the types, or classes, of storage devices available, and not the specifics of the devices.

During system boot-up, a SCSI port driver, either alone or in conjunction with a plug and play manager, identifies the devices that are accessible through the SCSI adaptor by relative location and class, e.g., disk or tape drive. If the system is operating in, for example, a Windows NT environment, the operating system then creates for the identified devices a set of device objects that can be used by the system components, to direct the generic data transfer commands to the respective storage devices.

To add fault tolerance to such a system, it is desirable to include in the system one or more additional SCSI adaptors that provide redundant paths from the PCI bus to the SCSI bus, and thus, to the storage devices. Adding the redundant SCSI adaptors to a system that uses Windows NT, however, causes the system to create additional sets of device objects for the storage devices. Specifically, the system creates one set that corresponds to the storage devices that are accessible through the first SCSI adaptor, a second set for the storage devices that are accessible through the second SCSI adaptor and so forth. Accordingly, each storage device is identified by multiple device objects, which may confuse or cause other problems for data transfer operations.

SUMMARY OF THE INVENTION

The inventive system includes a port duplex driver (PDD) that creates a "virtual SCSI adaptor," to control the operations of one or more conventional SCSI adaptors.

During boot-up operations or when the status of a device on the SCSI bus changes, the PDD identifies the virtual SCSI adaptor as the only adaptor that provides access to the storage devices on the SCSI bus. The system then assigns a single set of device objects to the storage devices and data transfer commands are directed to the storage devices through the virtual adaptors using the device objects. The PDD thereafter intercepts the commands that are directed through the virtual SCSI adaptor, and redirects them to a selected one of the actual SCSI adaptors. The selected SCSI adaptor then operates in a conventional manner, to translate the generic commands to device-specific commands for the storage devices, and so forth.

If the selected SCSI adaptor fails, the PDD redirects the data transfer operations instead through one of the redundant SCSI adaptors. The failure does not affect the remainder of the system, which continues to conduct data transfer operations through the virtual SCSI adaptor.

The PDD may create the virtual SCSI adaptor even for configurations in which a single SCSI adaptor is connected to the SCSI bus. In this way, one or more redundant SCSI adaptors may be added at a later time and mapped by the PDD to the existing virtual SCSI adaptor, without affecting the way in which the remainder of the system conducts data transfer operations.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
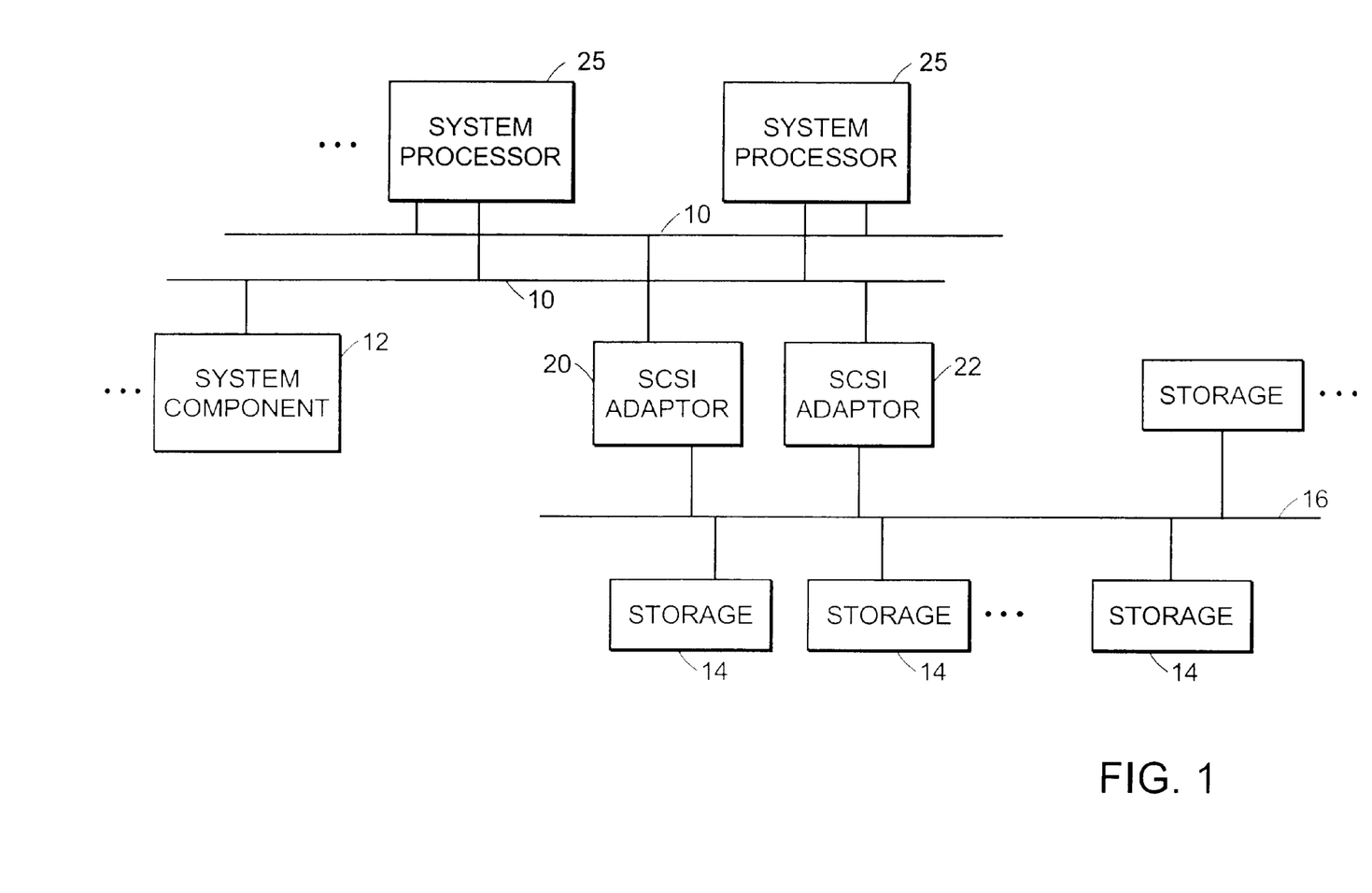
FIG. 1 is a functional block diagram of a system constructed in accordance with the invention.

Referring to FIG. 1, a computer system includes an I/O bus 10 that handles communications for various system components 12, such as, for example, a system processor. The I/O bus 10 in the exemplary system is a PCI bus. One or more storage devices 14, such as disk drives and/or tape drives, that participate in data transfer operations with the system components 12 connect to the system over a SCSI bus 16. Two SCSI adaptors 20 and 22 interconnect the I/O bus 10 and the SCSI bus 16, to provide redundant paths for communications between the system components 12 and the storage devices 14. This configuration of the SCSI bus is referred to herein as "dual initiated" SCSI bus. If only a single SCSI adaptor 20 is included in the system, the configuration is instead referred to as a "single initiated" SCSI bus. As depicted in the drawing, the system includes redundant system processors 25 and redundant I/O busses 10, to provide fault tolerant operation of the system processors and the SCSI adaptors. the system processors in the exemplary system operate in lock-step, and thus, perform the same operations at the same times.

Figure 2:
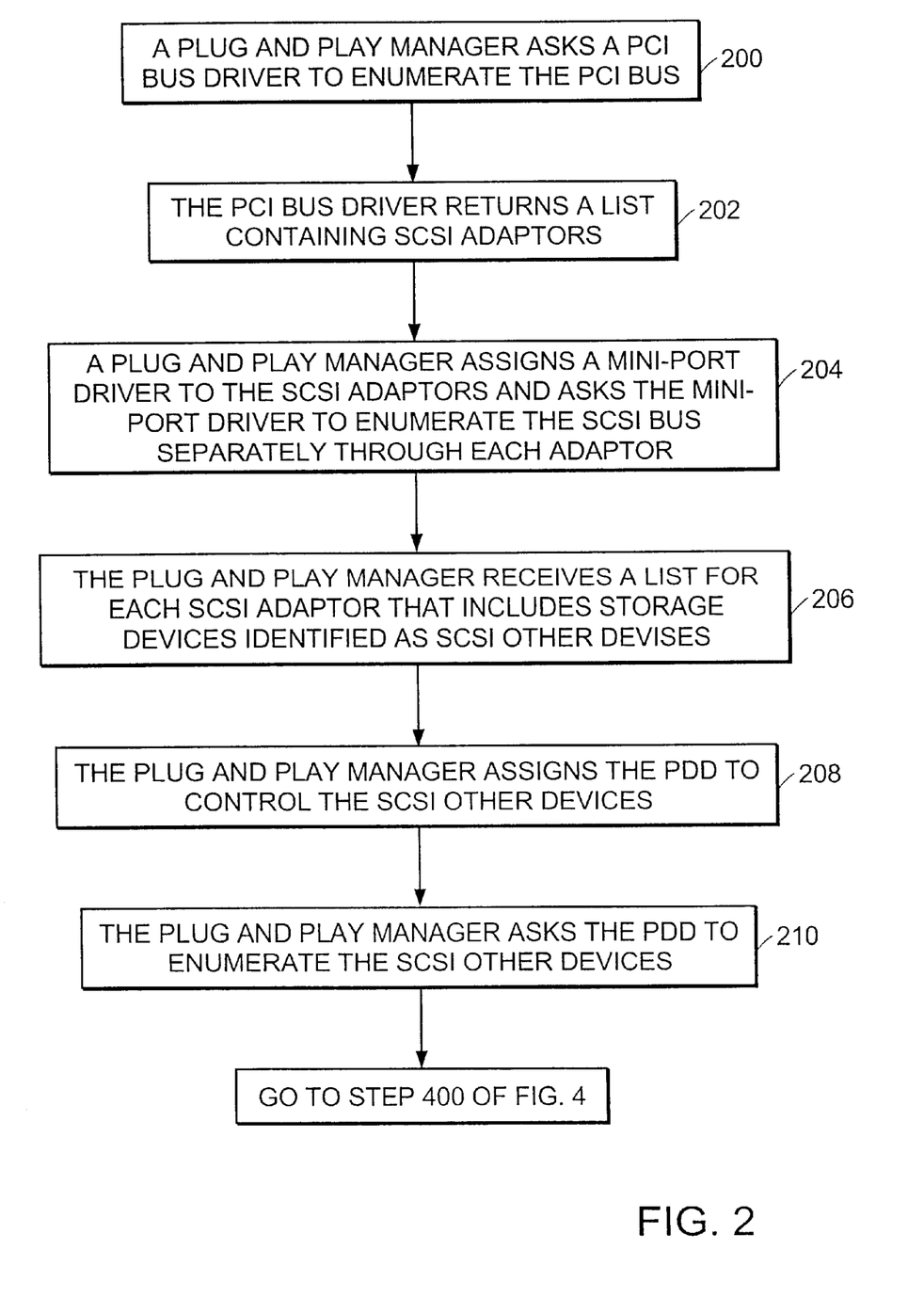
FIG. 2 is a flow chart of boot-up operations of the system.
Figure 3:
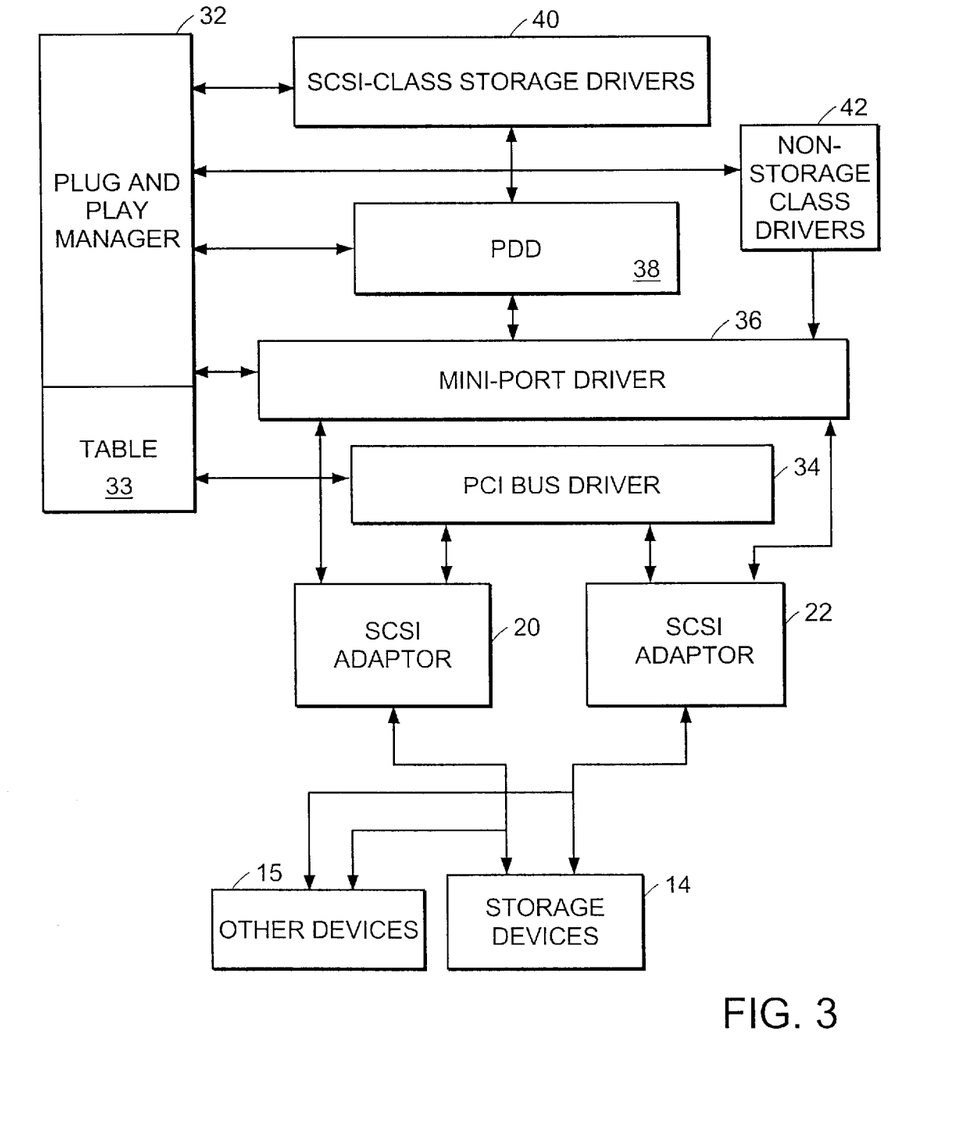
FIG. 3 is a more detailed functional block diagram of the system.

Referring also to FIGS. 2 and 3, during system boot-up, a plug-and-play manager 32 that is connected to or resident on the system processor 12 calls on a PCI bus driver 34 to enumerate the devices on the PCI bus 10 (step 200). The PCI bus driver queries the devices on the PCI bus and identifies the SCSI adaptors 21 and 22 to the plug and play manager (step 202). The PCI bus driver will also identify any other devices (not shown) that are connected to the bus, however, for the following discussion these devices are not of interest.

Referring also to FIGS. 2 and 3, during system boot-up, a plug-and-play manager 32 that is connected to or resident on the system processor 25 calls on a PCI bus driver 34 to enumerate the devices on the PCI bus 10 (step 200). The PCI bus driver queries the devises on the PCI bus and identifies the SCSI adaptors 20 and 22 to the plug and play manager (step 202). The PCI bus driver will also identify any other devices (not shown) that are connected to the bus, however, for the following discussion these devices are not of interest.

The plug-and-play manager 32 consults a stored look-up table 33, to determine which driver to assign to each SCSI adaptor 20 and 22. Based on the contents of the table, the plug-and-play manager then assigns a port driver 36, which is referred to herein also as a mini-port driver, to each SCSI adaptor 20 and 22.

In steps 204 and 206, the plug and play manager asks the mini-port driver to determine what is attached, for example, to the SCSI adaptor 20, that is, to enumerate the devices on the SCSI bus through that adaptor. In response to the request from the plug-and-play manager 32, the mini-port driver 36 sends queries to the devices on the SCSI bus 16, by location through the SCSI adaptor 20. The individual devices respond by sending back a response that indicates that the device is a storage device. The mini-port driver next returns to the plug and play manager a list of the devices associated with the SCSI adaptor 20, and identifies each storage device on the list as a "SCSI other" device. The plug and play manager similarly requests that the mini-port driver 36 enumerate the devices on the SCSI bus through the SCSI adaptor 22. The mini-port driver then queries the storage devices 14 through that adaptor. Each device responds to the query by sending back a response that indicates that the device is a storage device. The mini-port driver then returns a list of devices associated with the SCSI adaptor 20, and similarly identifies each storage device on the list as a SCSI other device.

The plug and play manager 32 next enters the stored look-up table 33 to determine which drivers to assign to the various SCSI other devices. Based on the contents of the table 33, the plug-and-play manager 32 assigns to each of the SCSI other devices a port duplex driver 38 (step 208). The port duplex driver, or PDD, may be loaded at this time or it may have been pre-loaded during an earlier step in the boot-up operations When the PDD is loaded, it creates a "virtual SCSI adaptor" and identifies the virtual device to the plug-and-play manager.

As a further step in the device enumeration operation, the plug-and-play manager 32 issues for each SCSI other device a request that the PDD 38 list what is connected to the device (step 210). In the example, the plug-and-play manager first requests enumeration of a particular SCSI other device that is connected to SCSI adaptor 20.

Figure 4:
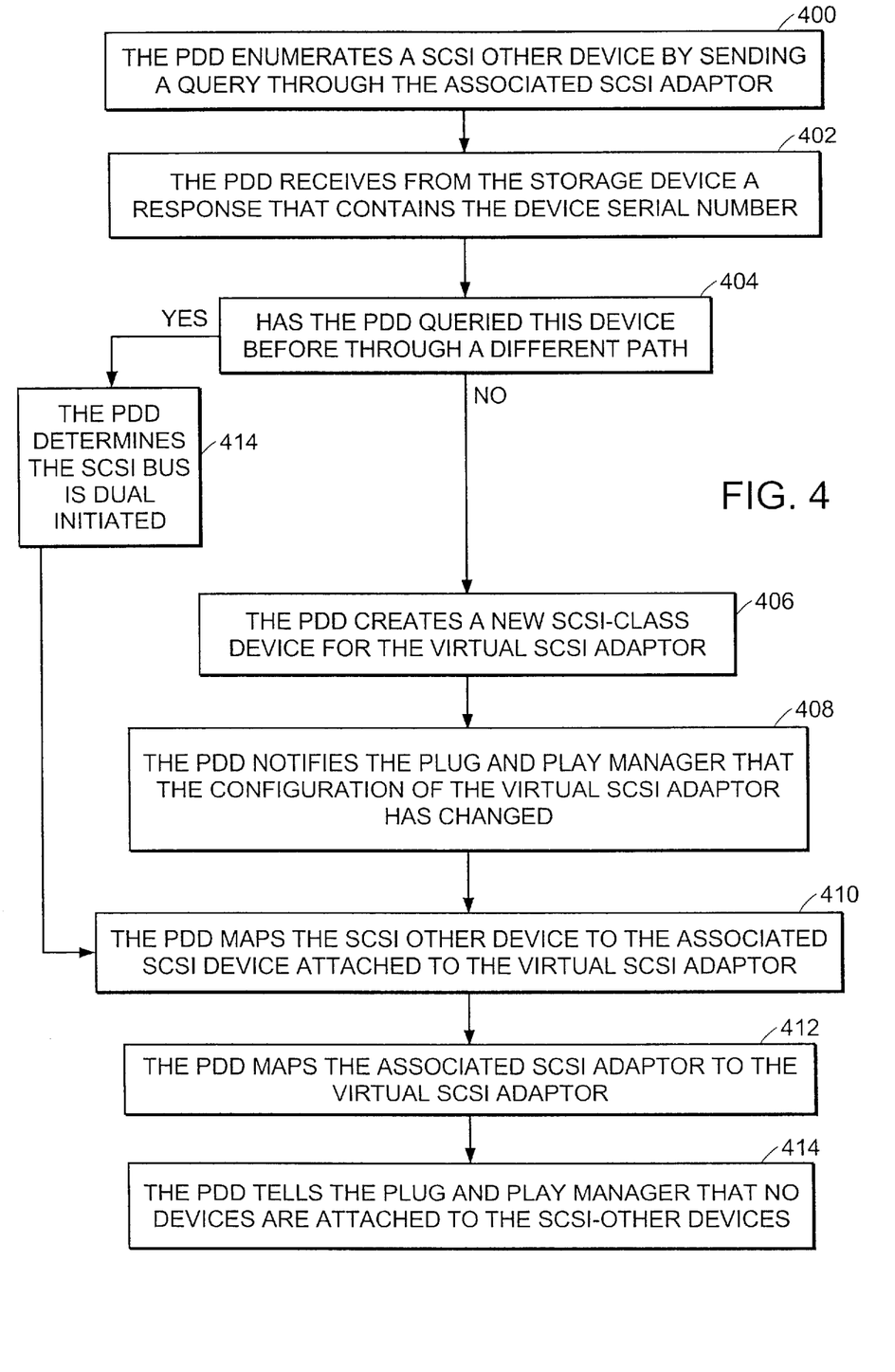
FIGS. 4–5 are more detailed flow charts of the operations system of FIG. 1.

The operations of the PDD 38 are discussed with reference to FIG. 4. In response to a request from the plug-and-play manager 32, the PDD enumerates the particular SCSI other device by sending a query to the corresponding storage device 14 through the associated SCSI adaptor 20 (step 400). The storage device responds by returning its serial number and any other requested information to the PDD through the adaptor 20. When the PDD receives the response, the PDD determines if it has already queried this device through another path to the device (steps 402, 404). The PDD thus checks if the serial number contained in the response matches a serial number contained in any previously received response.

If the serial number does not match any of the previously received serial numbers, the PDD creates a new SCSI-class device and "attaches" the device to the virtual SCSI adaptor (step 406). The PDD then tells the plug and play manager that the configuration of the virtual SCSI adaptor has changed (step 408). The PDD also internally maps the storage device 14 to the newly created SCSI-class device, and maps the SCSI adaptor 20 to the virtual adaptor (steps 410, 412).

If the serial number in the response from the associated storage device matches a serial number in a previous response, the PDD determines that the SCSI bus is dual initiated (step 414). The PDD then internally maps the storage device to the corresponding SCSI-class device attached to the virtual SCSI adaptor (step 410). Further, the PDD internally maps the associated SCSI adaptor, in the example, adaptor 20, to the virtual SCSI adaptor (step 412).

After mapping the SCSI other device to the appropriate SCSI-class device that is attached to the virtual SCSI adaptor, the PDD notifies the plug and play manager that no devices are attached to the SCSI other device (step 416).

The PDD operates in the same manner in response to the requests by the plug and play manager to enumerate each of remaining the SCSI other devices attached to the SCSI adaptor 20. The PDD also operates in the same manner in response to the requests by the plug and play manager to enumerate each of the SCSI other devices attached to the SCSI adaptor 22. When the PDD has responded to the last enumeration request, the PDD has internally mapped the SCSI other devices to a single set of SCSI-class devices that are attached to the virtual SCSI adaptor.

Figure 5:
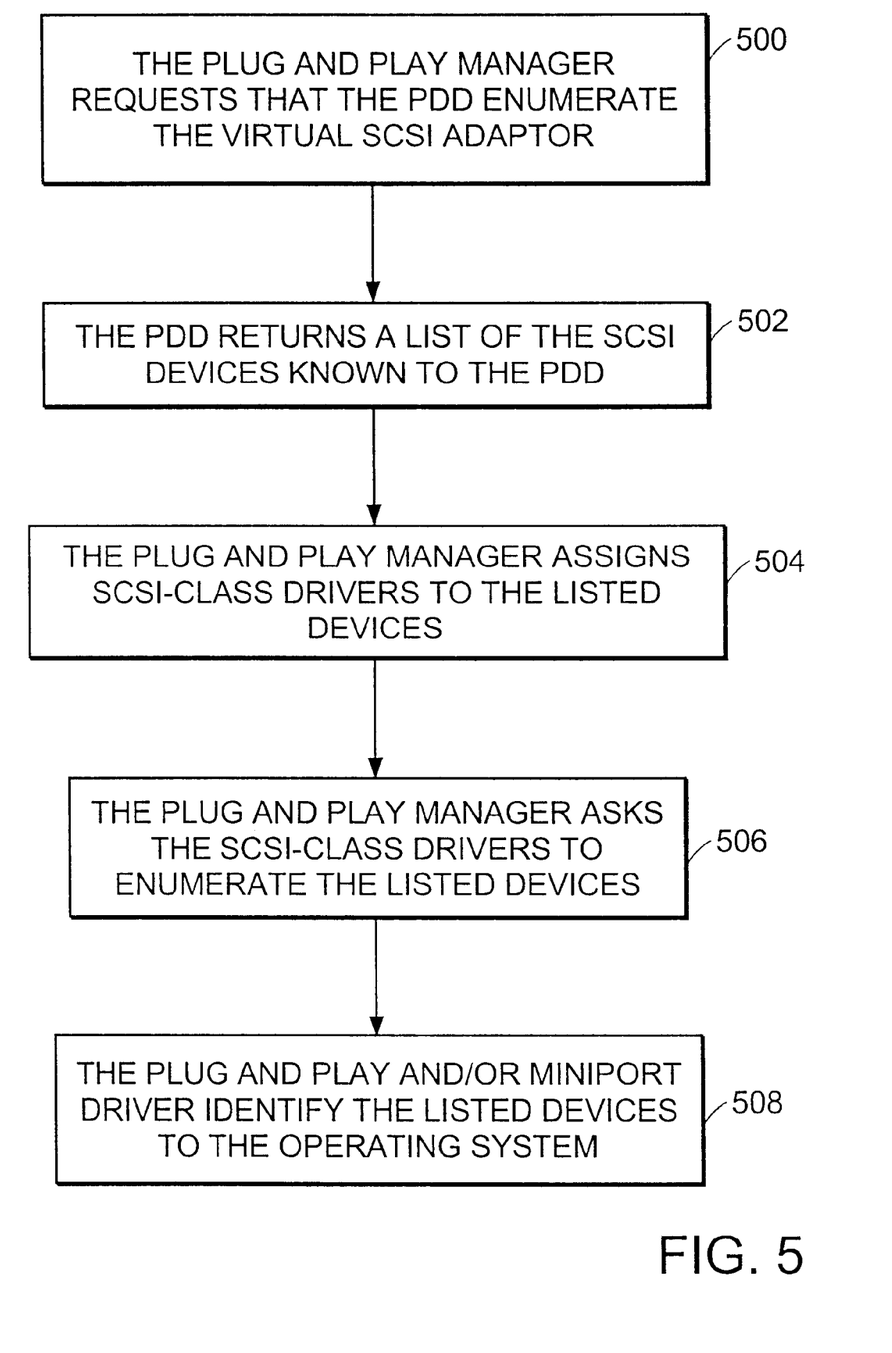

Referring also to FIG. 5, when the plug and play manager is notified by the PDD that the configuration of the virtual SCSI adaptor ahs changed, the plug and play manager requests that the PDD enumerate the devices connected to the virtual SCSI adaptor (step 500). In response to the request from the plug and play manager, the PDD provides a list of the SCSI-class devices then known to the PDD (step 502). The plug and play manger then consults its table 33 to assign to the listed SCSI-class devices the appropriate SCSI-class drivers 40 (FIG. 3) (step 504). The plug and play manager thus assigns an appropriate disk device driver to each SCSI-disk device and an appropriate tape device driver to each SCSI-tape device. The plug and play manager the, in a conventional manner, asks the assigned SCSI-class drivers 40 to separately enumerate each SCSI-class device (step 506).

In response to a request from the plug and play manager, a given SCSI-class driver directs a request to read partition information and so forth to a particular SCSI-class device on the list. The request is directed to the SCSI-class device through the virtual SCSI adaptor. The PDD thus intercepts the request and re-directs it through a selected SCSI adaptor 20 or 22 to the associated storage device 14. The selected SCSI adaptor then acts in a conventional manner to provide the requested access to the disk or tape device. The SCSI-class drivers 40 continue to enumerate each of the SCSI-class devices listed as attached to the virtual SCSI adaptor, and the PDD continues to direct associated requests through the selected SCSI adaptor to the corresponding storage devices 14.

When the SCSI-class drivers 40 have enumerated the SCSI-class devices and provided the necessary information to the plug and play manager 32 and the mini-port drivers 36, as appropriate, the plug and play manager and/or the mini-port driver then operate in a conventional manner to identify the SCSI disk devices and SCSI tape devices to the operating system (step 508). The operating system then assigns a set of device objects to the SCSI disk and tape devices in a conventional manner. Non-storage devices on the SCSI bus, depicted in FIG. 3 as blocks 15, are treated in a conventional manner by the mini-port driver. These devices are similarly assigned appropriate SCSI class drivers 42 (FIG. 3) and device objects, also in a conventional manner.

The operations of the mini-port driver and the PDD ensure that each storage device will be assigned a single device object, regardless of how many SCSI adaptors provide access to the storage device. When a generic data transfer command is addressed to a given storage device 14 using the assigned device object, the PDD 38 intercepts the command and redirects it to the corresponding storage device through the selected one of the SCSI adaptors 20 or 22. The selected SCSI adaptor then operates in a conventional manner, to translate the command to a device-specific command, and so forth.

Figure 6:
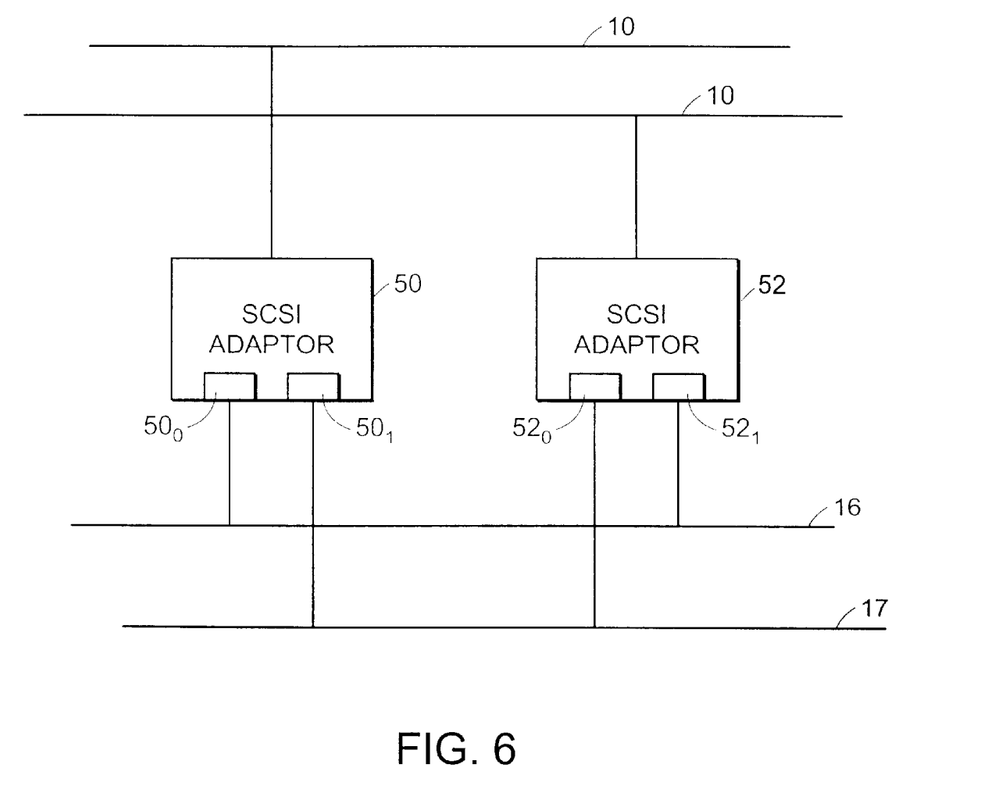
FIG. 6 is a functional block diagram of an alternative SCSI adaptor in the systems of FIG. 1.

Referring now to FIG. 6, the SCSI adaptors 20 and 22 may be single-ported and connect, respectively, to one SCSI bus as depicted in FIG. 1. Alternatively, as depicted in FIG. 6, the SCSI adaptors may be dual-ported and thus each connect to redundant SCSI busses 16 and 17. The two SCSI adaptors 50 and 52 depicted in the drawing each have primary and secondary ports $50_0$ and $50_1$ and $52_0$ and $52_1$, respectively. The primary port for each adaptor is, for example, the port with the lowest address, namely, $50_0$ or $52_0$. The hardware is configured such that the primary port $50_0$ of the SCSI adaptor 50 connects to one SCSI bus, in the example, the bus 16, and the secondary port $50_1$ of the adaptor connects to the second SCSI bus 17. The second of the SCSI adaptors has its primary port $52_0$ connected to the SCSI bus 17 and its secondary port $52_1$ connected to the SCSI bus 16.

With dual-ported SCSI adaptors, the PDD 38 selects one SCSI adaptor for use on one bus and another for use on the other bus, in order to load share between the two SCSI adaptors. In the example, the PDD selects the SCSI adaptor 50 for use on the SCSI bus 16, which is connected to the primary port $50_0$ of the adaptor. Similarly, the PDD selects the SCSI adaptor 52 for use on the SCSI bus 17. The PDD could instead select to use the adaptors on the busses that are connected to the secondary port of each adaptor, with the same load sharing result.

Figure 7:
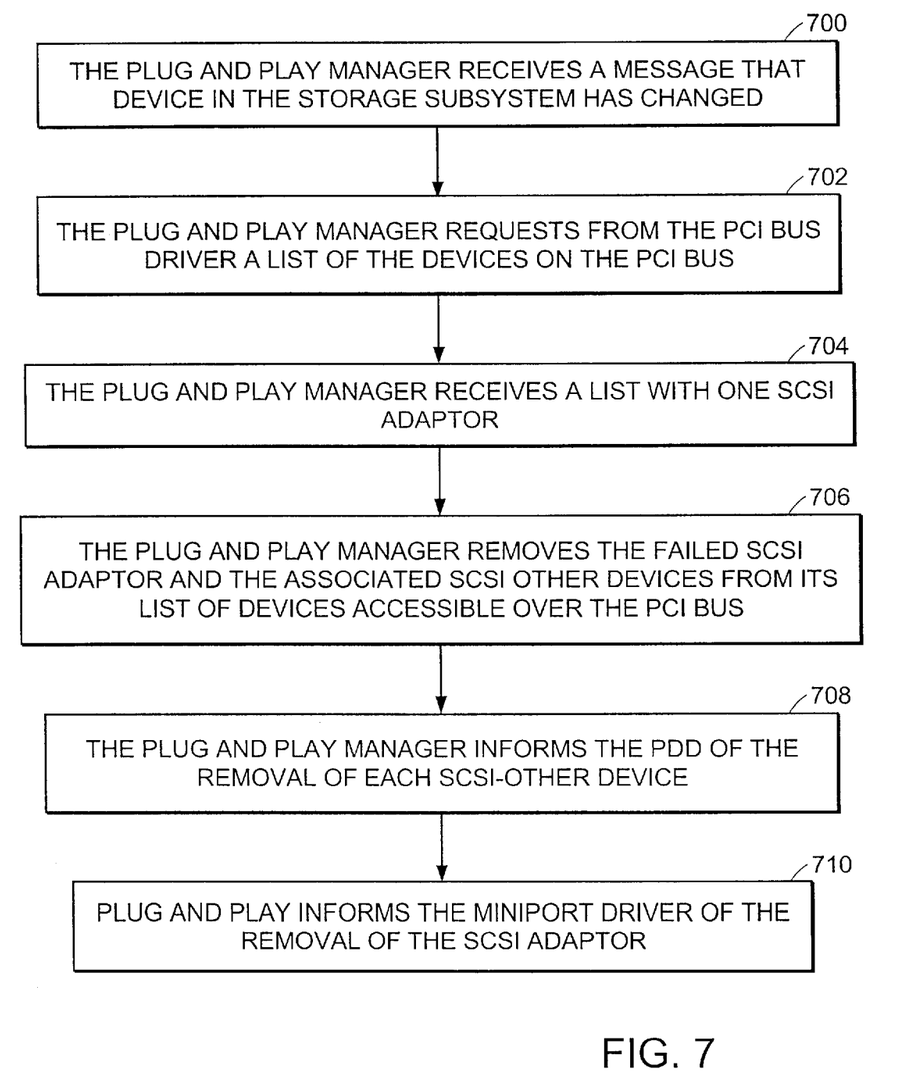
FIG. 7 is a flow chart of the operations of the system when a SCSI adaptor fails.

Referring now to FIGS. 3 and 7, if the selected SCSI adaptor, for example, adaptor 20, fails, the plug-and-play manager 32 receives a message from a hardware monitoring subsystem (not shown) that something in the storage subsystem has changed at the PCI bus level. Alternatively, the error message may be sent by the PDD 38, which receives error messages in response to requests sent through the failed adaptor (step 700). In response, the plug-and-play manager 32 generates an interrupt and asks the PCI bus driver 32 to again enumerate the PCI bus (step 702). The PCI bus driver now identifies only one SCSI adaptor, namely, the operative adaptor 22 (step 704).

The plug-and-play manager 32 next removes its prior listing of the failed SCSI adaptor 20 and the associated SCSI other devices (step 706). The plug and play manager then notifies the PDD 38 of the removal of each SCSI other device attached to the failed adaptor, and notifies the mini-port driver of the removal of the failed SCSI adaptor (steps 708–710).

The plug and play manager still sees the storage devices 14 as attached to the virtual SCSI adaptor, and thus, the plug and play manager does not see any change in the way data transactions are made with those devices. Accordingly, the plug and play manager determines that adaptor failure does not affect the data transfer operations, and no error message is required to be sent.

Figure 8:
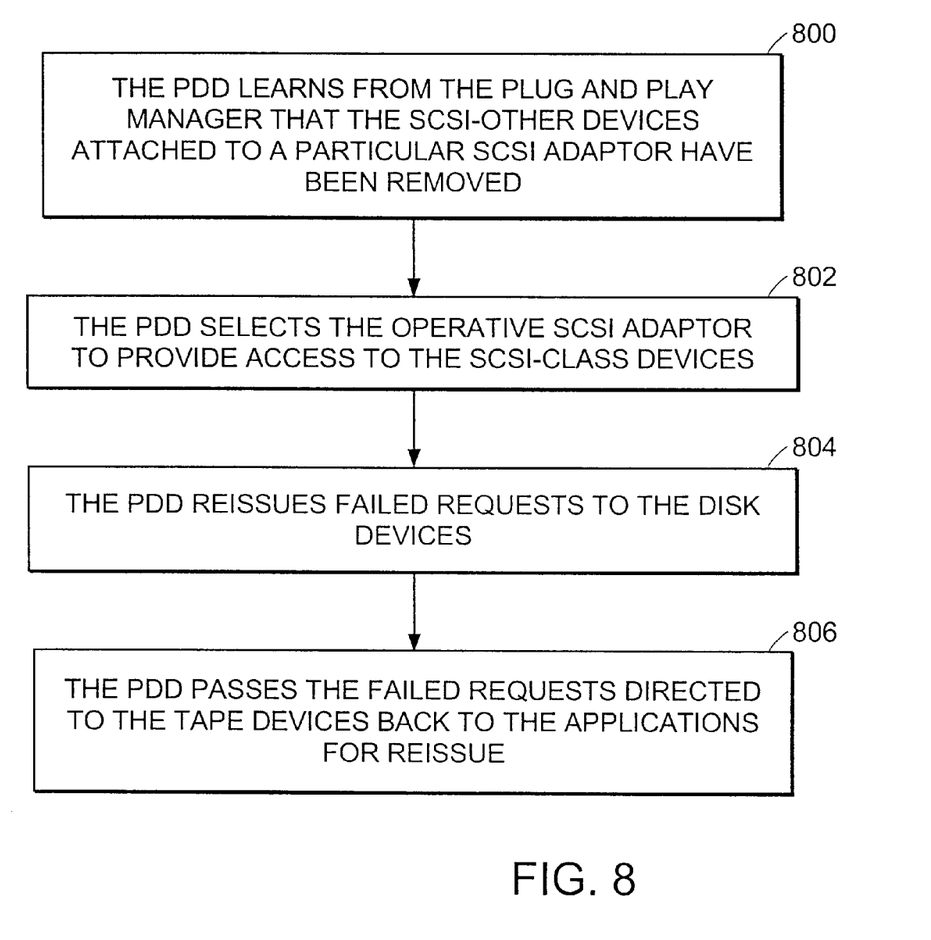
FIG. 8 is a flow chart of the operations of a port duplex driver when a SCSI adaptor fails.

Referring now also to FIG. 8, when the SCSI other devices attached to the SCSI adaptor 20 are removed by the plug and play manager, the PDD 38 selects the operative SCSI adaptor 22 for use in the data transfer operations (steps 800–802). Further, for those devices that are disk devices, the PDD controls a reissue, through the operative SCSI adaptor 22, of any requests that were directed through the failed adaptor 20 are now associated with error messages (step 804). For those devices that are tape devices, the PDD passes information relating to the failed requests back through the system to the applications that issued the requests (step 806). The applications then re-issued the requests in a conventional manner.

After failures inoperative SCSI adaptor may be rep , replaced and/or removed, without altering the way in which the system components 12 perform future data transfer operations. If the failed SCSI adaptor is repaired or replaced, the adaptor is enumerated and the PDD changes its internal mappings to the virtual SCSI adaptor and the associated SCSI-class devices attached to the virtual SCSI adaptor, to again include the redundant path to the devices. The PDD may then change its adaptor selection, to revert to the repaired or replaced adaptor for load sharing.

Instead of using the mini-port driver essentially to disguise the storage devices 14 as SCSI other devices, the system may use a filter driver that is inserted into the driver stack of the storage devices to intercept and respond to SCSI bus enumeration requests. In the response, the filter driver identifies the storage devices as a special class of device that is handled by the PDD, and the PDD then operates in the manner described above. This allows the mini-port driver to operate in a conventional manner, to identify various non-storage devices that fall into the conventional SCSI other class. In any event, conventional SCSI adaptors are used.

The foregoing description has been limited to a specific embodiment of this invention. It will be apparent, however, that variations and modifications may be made to the invention, such as the redundant SCSI bus adaptors may be bus adaptors for busses such as the USB, IEEE 1394, IBM serial storage architecture bus, Infiniband, IBM ESCON, or fiber channel, with the attainment of some or all of its advantages. Therefore, it is the object of the appended claims to cover all such variations and modifications as come within the true spirit and scope of the invention.

What is claimed is:

1. A computer system including:

A. one or more storage devices connected to a first bus;

B. one or more system components that connect to a second bus and communicate with the storage devices;

C. one or more bus adaptors for transferring communications to and from the second bus and the storage devices on the first bus;

D. a port duplex driver for mapping one or more communications paths to the storage devices through the one or more bus adaptors to a communication path through a virtual bus adaptor, E. object means for assigning to each storage device on the first bus a device object that corresponds to the communications path through the virtual bus adaptor, the object means informing the system components of the assigned device objects; and F. the port duplex driver further re-directing to a selected one of the bus adaptors communications from the system components that include the assigned device objects.

2. The computer system of claim 1 further comprising:
 a. a mini-port driver that identifies the storage devices as belonging to a given special class of device, and
 b. a plug and play manager that associates the given special class of device with the port duplex driver.

3. The computer system of claim 1 wherein the first bus is a SCSI bus and the second bus is a system I/O bus.

4. The computer system of claim 3 wherein the system I/O bus is a PCI bus.

5. The computer system of claim 1 wherein the port duplex driver changes the selection of the bus adaptor from a previously selected bus adaptor that has failed to an operative bus adaptor.

6. The computer system of claim 5 wherein the port duplex driver re-issues to the operative bus adaptor the communications that were directed to the failed bus adaptor after the failure.

7. The computer system of claim 1 further comprising:
 G. additional storage devices connected to another first bus,
 H. the one or more bus adaptors are dual ported, and
 I. the port duplex driver selects one bus adaptor for use on one first bus and a different bus adaptor for use on the other first bus.

8. A method of operating a computer system, the method comprising the steps of:
 A. determining that one or more storage devices are accessible over a first communications bus through one or more bus adaptors;
 B. mapping the one or more bus adaptors to a virtual bus adaptor and presenting to system components that communicate with the storage devices a communication path through the virtual bus adaptor to the storage devices;
 C. assigning to each storage device on the first communications bus a device object that corresponds to the communications path through the virtual bus adaptor;
 D. informing the system components of the assigned device object, and
 E. re-directing to a selected one of the bus adaptors the communications that are directed through the virtual bus adaptor to the storage devices.

9. The method of claim 8 wherein the step of determining that the one or more storage devices are accessible over the first communication bus includes:
 i. sending queries to the storage devices through each of the one or more bus adaptors and receiving responses from the storage devices through each of the one or more bus adaptors,
 ii. identifying the storage devices as devices that are controlled by a port duplex driver,
 iii. reporting by the port duplex driver that the storage devices are accessible through the virtual bus adaptor.

10. The method of claim 9 wherein the step of reporting by the port duplex driver includes
 a. determining that the one or more bus adaptors provide redundant paths to the storage devices, and
 b. mapping the bus adaptors that provide the redundant path to the same virtual bus adaptor.

11. The method of claim 10 wherein the step of determining redundant paths further includes
 c. identifying the storage devices as special devices that are accessible through each of the bus adaptors; and
 d. associating the special devices with the port duplex driver.

12. The method of claim 11 wherein the port duplex driver:
 e. in the step of reporting further includes reporting the virtual bus adaptor and the storage devices as devices to which the system assigns device objects, and
 f. in the step of re-directing further includes re-directing to a selected bus adaptor the communications that include the device objects that are assigned to the storage devices.

13. The method of claim 9 wherein the step of mapping further includes mapping a newly added bus adaptor to the virtual bus adaptor if the newly added bus adaptor provides a redundant path to the storage devices.

* * * * *